United States Patent
Ren et al.

(10) Patent No.: US 11,271,193 B2
(45) Date of Patent: Mar. 8, 2022

(54) SYNTHESIS OF METAL METAPHOSPHATE FOR CATALYSTS FOR OXYGEN EVOLUTION REACTIONS

(71) Applicant: University of Houston System, Houston, TX (US)

(72) Inventors: Zhifeng Ren, Pearland, TX (US); Shuo Chen, Houston, TX (US); Fang Yu, Houston, TX (US); Haiqing Zhou, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 361 days.

(21) Appl. No.: 16/492,319

(22) PCT Filed: Mar. 12, 2018

(86) PCT No.: PCT/US2018/022051
§ 371 (c)(1),
(2) Date: Sep. 9, 2019

(87) PCT Pub. No.: WO2018/169882
PCT Pub. Date: Sep. 20, 2018

(65) Prior Publication Data
US 2021/0135184 A1    May 6, 2021

Related U.S. Application Data

(60) Provisional application No. 62/470,847, filed on Mar. 13, 2017.

(51) Int. Cl.
*H01M 4/04* (2006.01)
*C25B 1/04* (2021.01)
*H01M 4/02* (2006.01)

(52) U.S. Cl.
CPC ............. *H01M 4/0428* (2013.01); *C25B 1/04* (2013.01); *H01M 2004/021* (2013.01)

(58) Field of Classification Search
None
See application file for complete search history.

(56) References Cited

U.S. PATENT DOCUMENTS

| | | | | |
|---|---|---|---|---|
| 6,225,009 | B1 * | 5/2001 | Fleischer | ............... H01M 4/60 429/306 |
| 2010/0101955 | A1 | 4/2010 | Nocera et al. | |
| 2011/0136047 | A1 * | 6/2011 | Merzougui | ........... H01M 4/925 429/524 |
| 2015/0072237 | A1 * | 3/2015 | Woo | .................... H01M 4/5825 429/219 |

OTHER PUBLICATIONS

PCT/US2018/022051 International Search Report and Written Opinion dated May 24, 2018 (14 p.).
(Continued)

*Primary Examiner* — Christopher P Domone
(74) *Attorney, Agent, or Firm* — Conley Rose, P.C.

(57) ABSTRACT

A method of manufacturing an electrode by disposing a three-dimensional substrate in a metal nitrate solution, drying, and thermally phosphatizing with a phosphorus source under inert gas to form a metal based phosphate catalyst on the substrate. An electrocatalyst and electrode produced via the method are also provided.

24 Claims, 11 Drawing Sheets

(56) References Cited

OTHER PUBLICATIONS

Li, Yibing et al., "Enhancing Water Oxidation Catalysis on a Synergistic Phosphorylated NiFe Hydroxide by Adjusting Catalyst Wettability," American Chemical Society, vol. 7, Mar. 1, 2017, pp. 2535-2541 (20 p.).

You, Bo et al., "Hierachically Porous Urchin-Like Ni2P Superstructures Supported on Nickel Foam as Efficient Bifunctional Electrocatalysts for Overall Water Splitting," American Chemical Society, vol. 6, Dec. 21, 2015, pp. 714-721 (8 p.).

Zhao, Hui et al., "Transition Metal-Phosphorus-Based Materials for Electrocatalytic Energy Conversion Reactions," Catalysis Science &Technology, vol. 7, Oct. 17, 2016, pp. 330-347 (19 p.).

Ahn, Hyun S. et al., "Electrocatalytic Water Oxidation at Neutral pH by a Nanostructured Co(PO3)2 Anode," Advanced Functional Materials, vol. 23, Aug. 29, 2012 (7 p.).

\* cited by examiner

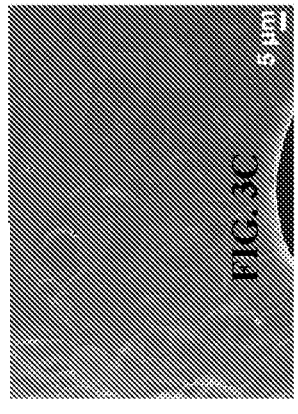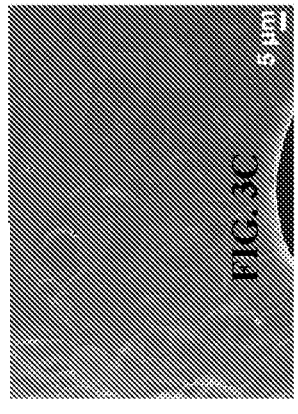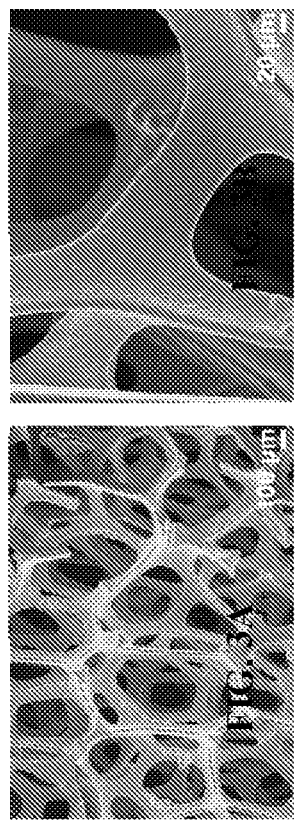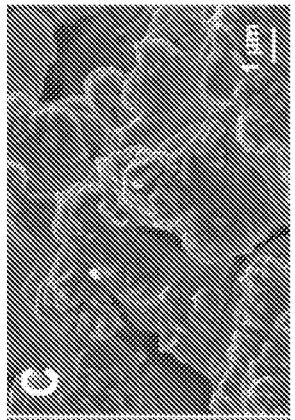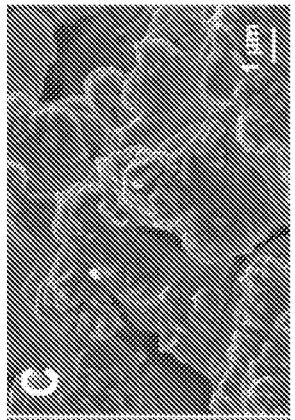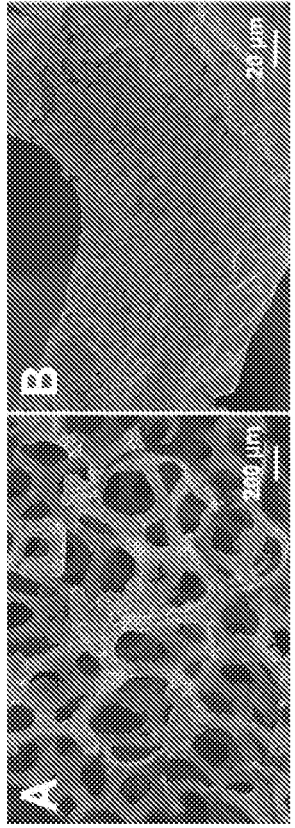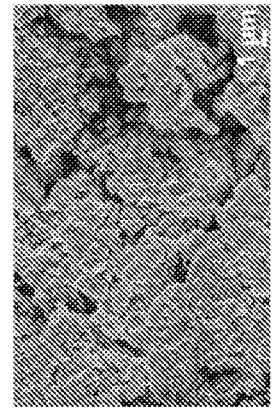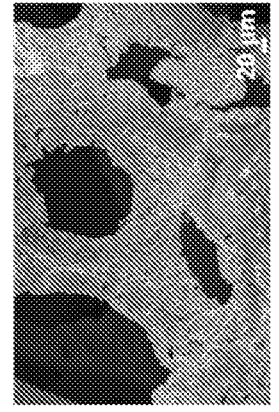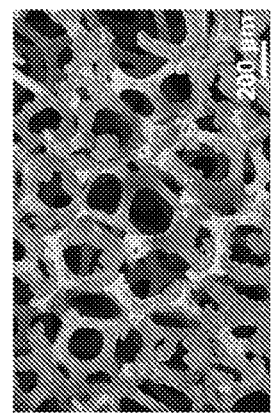
FIG. 3A  FIG. 3B  FIG. 3C
FIG. 4A  FIG. 4B  FIG. 4C
FIG. 5A  FIG. 5B  FIG. 5C

SYNTHESIS OF METAL METAPHOSPHATE FOR CATALYSTS FOR OXYGEN EVOLUTION REACTIONS

CROSS-REFERENCE TO RELATED APPLICATIONS

The present application is a 35 U.S.C. § 371 national stage application of PCT/US2018/022051 filed Mar. 12, 2018, and entitled "Synthesis of Metal Metaphosphate for Catalysts for Oxygen Evolution Reactions," which claims priority under 35 U.S.C. § 119(e) to U.S. Provisional Patent Application No. 62/470,847 filed on Mar. 13, 2017 and entitled "Synthesis of Metal Metaphosphate for Catalysts for Oxygen Evolution Reactions," each of which is hereby incorporated herein by reference in their entirety for all purposes.

STATEMENT REGARDING FEDERALLY SPONSORED RESEARCH OR DEVELOPMENT

This research was sponsored by the US Defense Threatening Reduction Agency (DTRA) FA 7000-13-1-0001 and US Department of Energy under Contract No. DE-SC0010831.

TECHNICAL FIELD

The present disclosure relates to water splitting; more particularly, the present disclosure provides electrocatalysts for efficient water oxidation; still more particularly, the present disclosure provides highly active oxygen evolution reaction (OER) catalyst derived from 3D foam and ferrous metaphosphate.

BACKGROUND

Water splitting is a term that refers to the chemical reaction where water is separated into its elements of hydrogen and oxygen. This may be employed in order to obtain hydrogen for various applications, including hydrogen fuel production. Hydrogen ($H_2$) production from electrochemical water splitting is a clean and sustainable energy resource that may be used to substitute fossil fuels and meet rising global energy demand, since water is the only starting source and byproduct during fuel burning in an engine. The oxygen evolution reaction (OER), also named water oxidation, which is an oxidative half reaction in water splitting, is used to extract carbon fuels from carbon dioxide reduction or metal-air batteries. However, owing to the sluggish four proton-coupled electron transfer and rigid oxygen-oxygen bond formation, this process remains a major bottleneck of an overall water splitting system. Noble-metal oxide catalysts, such as iridium dioxide ($IrO_2$) and ruthenium dioxide ($RuO_2$), which may be currently employed for the purpose of OER catalytic activity, utilize large overpotentials to expedite the reaction. Additionally, these compounds are scarce and expensive, which may hinder the potentially substantial market penetration of this technique. Thus, it is highly desirable to develop robust and stable oxygen-evolving electrocatalysts from earth-abundant and cost-effective elements instead of precious metal-containing catalysts.

Conventional commercial water electrolyzers use a competent electrocatalyst that has the capacity of delivering highly oxidative currents above 500 mA/cm² with long-term stability at low overpotentials (e.g., less than 300 mV). Despite various earth-abundant materials, such as transition metal oxides, hydroxides, oxyhydroxides, phosphates, phosphides, and carbon nanomaterials, being efficient catalysts toward oxygen evolution, few such materials show sufficient potential to meet the aforementioned commercial criterion for a water-alkali electrolyzer.

Accordingly, a need exists for a convenient and possibly industry-compatible strategy to realize the fabrication of a robust catalyst for oxygen evolution. Desirably, such a catalyst exhibits viable operation at high current density (e.g., greater than or equal to about 300, 400, or 500 mA/cm²) with a low overpotential (e.g., less than or equal to about 300, 290, 280, or 275 mV), without decaying, and shows no sign of decay over a substantial time (e.g., 10, 15, or 20 hours).

SUMMARY

Herein disclosed is a method of manufacturing an electrode, the method comprising: disposing a three-dimensional substrate in a metal nitrate solution; drying; and thermally phosphatizing with a phosphorus source under inert gas to form a metal based phosphate catalyst on the substrate.

Also disclosed herein is an electrode comprising: a substrate; and a metal-based phosphate catalyst formed on a surface of the substrate.

Also disclosed herein is a method of electrocatalytic water splitting, the method comprising: forming an oxygen-evolving electrocatalyst comprising a uniform distribution of a metal-based phosphate catalyst on a conductive substrate; and utilizing the oxygen-evolving electrocatalyst as an electrode for the oxygen evolution reaction.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 3A-3C are Scanning Electron Microscopy (SEM) images of morphologies of pristine/starting three-dimensional Ni foam;

FIGS. 4A-4C are SEM images of as-prepared $Fe(PO_3)_2$ catalysts on three-dimensional $Ni_2P$/Ni foam according to embodiments of the present disclosure;

FIGS. 5A-5C are SEM images of morphologies of post-OER $Fe(PO_3)_2$ according to certain embodiments of the present disclosure;

DETAILED DESCRIPTION

Figure 1:
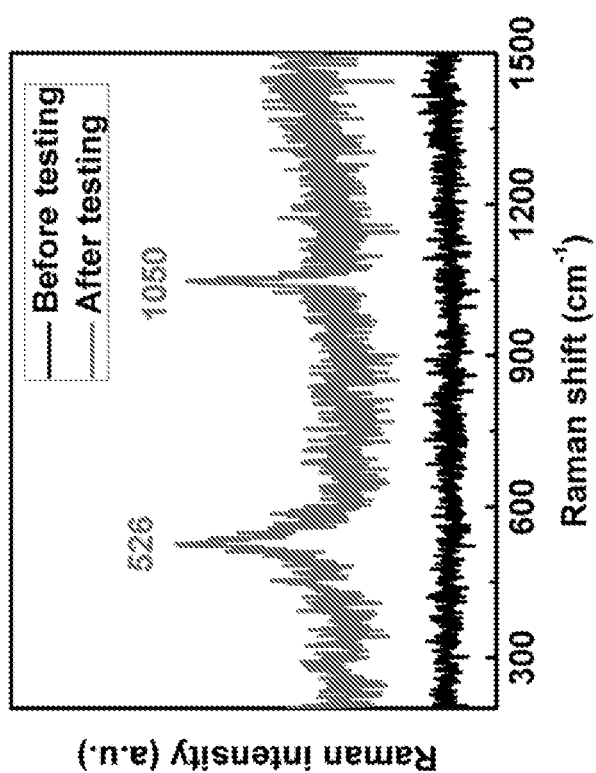
FIG. 1 illustrates Raman spectra of $Ni_2P$ catalysts before and after OER testing of 10,000 cycles collected under a Renishaw inVia Raman Spectroscope with He—Ne laser at 633 nm as an excitation source.

It should be understood at the outset that although an illustrative implementation of one or more exemplary embodiments are provided below, the disclosed compositions, methods, and/or products may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ."

Overview

Discussed herein are methods of fabrication of an electrocatalyst derived from metal-based phosphate (e.g., ferrous metaphosphate $Fe(PO_3)_2$) supported on a substrate (e.g., a conductive metal substrate such as commercial Ni foam), and the resulting electrocatalyst, which is competent for catalyzing the water oxidation reaction with outstanding catalytic performance. In embodiments, the herein disclosed electrocatalyst (also referred to as an OER 'electrode') requires an overpotential of only 265 mV to afford at least 300, 400, or 500 mA/cm$^2$ with long-term electrochemical durability during OER operating conditions.

Efficient and durable oxygen evolution reaction (OER) electrocatalysts made from earth-abundant and cheap elements are important for large-scale water splitting, which has attracted increasing attention due to the production of renewable $H_2$ energy resource. The first-row transitional metals (Fe, Co, and Ni)-based catalysts are promising as potential candidates as OER catalysts because of their earth abundance and low costs. Discussed herein are systems and method employed to achieve an exceptional OER catalyst. In embodiments, the catalyst is formed by growing $Fe(PO_3)_2$ on commercial Ni foam, and uses a low overpotential (e.g., about 265 mV) to achieve a current density of at least 300, 400, or 500 mA/cm$^2$. In embodiment, the herein-disclosed catalyst meets the criteria for OER catalysts for commercial use, e.g., 500 mA/cm$^2$ below 300 mV with good stability.

One bottleneck in the electrocatalytic water splitting process may be the sluggish water oxidation reaction arising from the lack of exceptional catalysts that can afford a large current density (e.g., 300, 400, or 500 mA/cm$^2$) with long vitality below 300 mV overpotentials. Discussed herein are approaches to fabricate a robust oxygen-evolving electrocatalyst. In embodiments, as described in more detail hereinbelow, the robust electrocatalyst is formed by grafting ferrous metaphosphate onto self-supported three-dimensional substrates such as, without limitation, a conductive nickel foam. Hitherto substantial efforts have been devoted to making highly active OER catalysts, however, rare competitive catalysts are available to be compatible with the conventional commercial electrolyzer because of the high overpotentials required to achieve a large current (e.g., above 500 mA/cm$^2$) and possible electrochemical instability during high-current operation.

In embodiments, water-soluble iron nitrate salts can be grafted onto commercial Ni foam followed by thermal phosphidation, during which di-nickel phosphide ($Ni_2P$) is simultaneously formed at the surface of the Ni foam. The resultant as-synthesized material constructed by $Fe(PO_3)_2$ materials supported on a conductive $Ni_2P$/Ni foam scaffold may be employed, in embodiments of this disclosure, as an oxygen-evolving electrocatalyst with outstanding catalytic activity. A catalyst fabricated as disclosed herein may deliver at least 300, 400, or 500 mA/cm$^2$ at a low overpotential (e.g., less than 300, 275, or 265 mV) with good electrochemical durability in alkaline electrolyte. The herein-disclosed electrocatalyst may manifest a significant factor (e.g., a factor of greater than or equal to 45, 46, 47, 48, or 49) of activity enhancement in boosting water oxidation at 300 mV relative to the state-of-the-art $IrO_2$ catalyst, potentially enabling realization of such commercial criterion for large-scale commercial water-alkali electrolyzers.

Method of Making Electrocatalyst/Electrode

As noted above, herein-disclosed is a method of manufacturing an electrode/electrocatalyst. The method comprises: disposing a three-dimensional substrate in a metal nitrate solution; drying; and thermally phosphatizing with a phosphorus source under inert gas to form a metal based phosphate catalyst on the substrate. In embodiments, the method further comprises cooling under inert gas; and repeating the steps of disposing, drying, and thermally phosphatizing.

In embodiments, the three-dimensional substrate comprises a metallic foam or carbon cloth paper. For example, the metallic foam can comprise nickel (Ni), copper (Cu), iron (Fe), cobalt (Co), titanium (Ti), or a combination thereof.

In embodiments, the metal nitrate can be selected from iron nitrate, cobalt nitrate, nickel nitrate, manganese nitrate, copper nitrate, or a combination thereof. In embodiments, the method further comprises, prior to disposing the three-dimensional substrate in the metal nitrate solution, forming the metal nitrate solution by dissolving a metal nitrate precursor in deionized (DI) water. In embodiments, the metal nitrate comprises ferric (iron(III)) and/or ferrous (iron (II)) nitrate. In embodiments, the metal nitrate and/or metal nitrate precursor comprises iron(III) nitrate nonahydrate [Fe(NO$_3$)$_3$·9H$_2$O], iron (II) nitrate, cobalt nitrate, nickel nitrate, manganese nitrate, copper nitrate, or a combination thereof. In embodiments, the metal-based phosphate catalyst comprises ferrous metaphosphate Fe(PO$_3$)$_2$. In such embodiments, the electrode/electrocatalyst can comprise or be referred to as an Fe(PO$_3$)$_2$/Ni$_2$P/Ni foam, as described in detail hereinbelow.

As noted above, the herein-disclosed method can comprise drying. The drying can be performed subsequent disposing the three-dimensional substrate in the metal nitrate solution. In embodiments, drying comprises drying in ambient air.

As noted above, the herein-disclosed method can comprise thermally phosphatizing with a phosphorus source under inert gas to form a metal based phosphate catalyst on the substrate. In embodiments, thermally phosphatizing with a phosphorus source comprises a phosphorus source selected from sodium hypophosphite monohydrate (NaH$_2$PO$_2$·H$_2$O), ammonium hypophosphite (NH$_4$H$_2$PO$_2$), phosphorus, other phosphorus containing materials, or a combination thereof. Thermal phosphatizing can be performed as known in the art. In embodiments, thermal phosphidation is effected at a temperature in the range of from about 350° C. to about 550° C., from about 375° C. to about 450° C., or from about 400° C. to about 450° C. In embodiments, thermally phosphatizing comprises direct thermal phosphidation in a tube furnace or a chemical vapor deposition (CVD) system or molecular organic chemical vapor deposition (MOCVD) system under inert gas atmosphere. In embodiments, the inert gas utilized during thermal phosphidation (and/or a cooling step described further hereinbelow) comprises substantially pure argon. In embodiments, thermal phosphidation is effected at a temperature of less than or equal to about 400° C., 425° C., or 450° C. In embodiments, thermal phosphatizing is effected in a time of less than or equal to about 1.5 hours, 1.25 hours, or 1 hour.

As noted above, the method can further comprise cooling under inert gas, such as argon atmosphere. The method can further comprise repeating the steps of disposing the (once-disposed) three-dimensional substrate in a metal nitrate solution, drying, and/or thermally phosphatizing with a phosphorus source under inert gas. If the steps are repeated, they may be performed as described herein, and may be performed in substantially the same or a different manner from the steps followed the first time. For example, during the repeating of the step(s), the metal nitrate solution may be the same or different, drying may be omitted, the thermal phosphatizing may be effected for a longer or shorter time period, at a higher or lower temperature, with a same or different phosphorus source or inert gas, etc.

The metal-based phosphate catalyst formed on the substrate can comprise ferrous metaphosphate (Fe(PO$_3$)$_2$), cobalt metaphosphate (Co(PO$_3$)$_2$), nickel metaphosphate (Ni(PO$_3$)$_2$), manganous metaphosphate (Mn(PO$_3$)$_2$), or a combination thereof. In embodiments, the metal-based phosphate catalyst loading on the substrate can be in the range of from about 2 to about 15 mg/cm$^2$, from about 5 to about 10 mg/cm$^2$, or from about 6 to about 8 mg/cm$^2$.

Herein-Disclosed Electrocatalyst/Electrode

Also disclosed herein is an electrode/electrocatalyst comprising: a substrate; and a metal-based phosphate catalyst formed on a surface of the substrate. The metal-based phosphate catalyst can comprise a metal selected from iron, manganese, cobalt, copper, nickel, or a combination thereof. In embodiments, the metal-based phosphate catalyst comprises ferrous metaphosphate (Fe(PO$_3$)$_2$), cobalt metaphosphate (Co(PO$_3$)$_2$), nickel metaphosphate (Ni(PO$_3$)$_2$), manganous metaphosphate (Mn(PO$_3$)$_2$), or a combination thereof. The herein-disclosed electrode/electrocatalyst can, in embodiments, have a metal-based phosphate catalyst loading in the range of from about 2 to about 15 mg/cm$^2$, from about 5 to about 10 mg/cm$^2$, or from about 6 to about 8 mg/cm$^2$.

The electrode/electrocatalyst comprises a substrate. The substrate can comprise a conductive foam. In embodiments, the substrate comprises a metal foam. For example, in embodiments, the substrate comprises nickel (Ni) foam. In embodiments, the electrode/electrocatalyst comprises a nickel (Ni) foam substrate and can further comprise nickel phosphide (Ni$_2$P) formed between the nickel foam and the metal-based phosphate catalyst (e.g., ferrous metaphosphate catalyst). In embodiments, the substrate comprises a three-dimensional, porous Ni$_2$P/Ni foam. In some such embodiments, the electrode/electrocatalyst can comprise an Fe(PO$_3$)$_2$/Ni$_2$P/Ni foam.

The foam substrate can have any suitable thickness. For example, in embodiments, the foam has a thickness in the range of from about 1 mm to about 2 mm. In embodiments, the foam may have a purity of at least 99.8%. In embodiments, the foam comprises a nickel foam. In embodiments, the nickel foam can have a surface density in the range of from about 280 g/m$^2$ to about 340 g/m$^2$. In embodiments, the nickel foam can have a porosity of greater than or equal to about 95, 96, or 97%, or in the range of from about 95 to about 97%, and may comprise from about 80 to about 110 pores per inch, and/or average pore diameters in the range of from about 0.2 to about 0.6 mm.

In embodiments discussed further hereinbelow with reference to a method of electrocatalytic water splitting, when operated in 1M alkaline solution (e.g., 1M KOH solution), the herein-disclosed electrocatalyst operates as an oxygen-evolving electrocatalyst (OER), and yields a current density of at least 300, 400, or 500 mA/cm$^2$ at an overpotential of less than or equal to about 259 mV, 265 mV, or 275 mV, exhibits durability for at least 15, 20 or 23 hours and/or 10,000 cycles (wherein a cycle is defined as from 1.024 V vs RHE to 1.524 V vs RHE and backward), is operable for at least 18, 20, or 25 hours at 300, 400, or 500 mA/cm$^2$, or a combination thereof.

In embodiments discussed further hereinbelow with reference to a method of electrocatalytic water splitting, when operated in 0.1M alkaline solution (e.g., 0.1M KOH solution), the herein-disclosed electrocatalyst operates as an oxygen-evolving electrocatalyst (OER), and requires an overpotential of less than or equal to about 225, 220, or 218 mV to deliver a geometric current density of 10 mA/cm$^2$.

Herein-Disclosed Method of Electrocatalytic Water Splitting

Also provided herein is a method of electrocatalytic water splitting. The method comprises forming an oxygen-evolving electrocatalyst as per this disclosure; and utilizing the oxygen-evolving electrocatalyst as an electrode for the oxygen evolution reaction. Any electrocatalyst described herein may be utilized in the herein-disclosed method of water splitting. In embodiments, the oxygen-evolving electrocatalyst of this disclosure comprises a substantially uniform distribution of a metal-based phosphate catalyst on a conductive substrate. As noted hereinabove, the conductive substrate can comprise a nickel phosphide/nickel (Ni$_2$P/Ni) foam, in embodiments. The metal-based phosphate can comprise a metal selected from iron, manganese, cobalt, copper, nickel, or a combination thereof. For example, in embodiments, the metal-based phosphate comprises ferrous metaphosphate Fe(PO$_3$)$_2$, and the electrode can comprise a hybrid Fe(PO$_3$)$_2$/Ni$_2$P/Ni foam.

In embodiments, when operated in 1M alkaline solution, the oxygen-evolving electrocatalyst yields a current density of at least 300, 400, or 500 mA/cm$^2$ at an overpotential of less than or equal to about 259, 265 or 275 mV. In embodiments, the herein-disclosed oxygen-evolving electrocatalyst exhibits a durability (as measured by chronoamperometry scan) for at least 22 hours, or 10,000 cycles, wherein a 'cycle' comprises forward and backward from 1.024 V vs RHE to 1.524 V vs RHE. In embodiments, the herein-disclosed oxygen-evolving electrocatalyst is operable for at least 15, 20, or 22 hours at 300, 400, or 500 mA/cm$^2$. In embodiments, when operated in 0.1M alkaline solution, the oxygen-evolving electrocatalyst yields a current density of at least 10 mA/cm$^2$ at an overpotential of less than or equal to about 225, 220, or 218 mV.

Features and Potential Advantages

In embodiments, an electrocatalyst of this disclosure requires an overpotential of only 265 mV to afford 500 mA/cm$^2$ with long term electrochemical durability during OER operating conditions. The herein-disclosed electrocatalyst/electrode can be utilized to produce hydrogen via overall water splitting, for example, when coupled with robust hydrogen evolution electrocatalysts. The electrocatalyst/electrode may be applicable in the production of oxygen, for example providing patients oxygen in hospitals, astronauts in spacecraft, etc. Without limitation, the herein-disclosed electrocatalyst/electrode may be useful in solar water splitting if hybridized with a light absorber, may be useful in metal-air batteries, and/or may be used for carbon dioxide reduction to carbon fuels.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Materials: Iron(III) nitrate nonahydrate (Fe(NO$_3$)$_3$·9H$_2$O, ≥299.95%, Sigma-Aldrich), Nafion 117 solution (5%, Sigma-Aldrich), sodium hypophosphite monohydrate (NaH$_2$PO$_2$·H$_2$O, Alfa Aesar), iridium oxide powder (IrO$_2$, 99%, Alfa Aesar), potassium hydroxide (KOH, 50% w/v, Alfa Aesar), and Ni foam (1.5 mm, areal density 320 g/cm$^2$) were used as received.

Example 1

Ferrous Metaphosphate Catalyst on Three-Dimensional Material

Growth of Ferrous Metaphosphate Catalyst on Three-Dimensional Material

Ferrous metaphosphate was fabricated by a direct thermal phosphidation process, as described in PNAS, Vol. 114, No. 22, May 30, 2017, pp. 5607-5611, which is hereby incorporated herein by reference for purposes not contrary to this disclosure. A commercial Ni foam was dipped into an iron nitrate solution and slowly dried in air, and subsequently thermally phosphatized at 450° C. for 1 h in argon (Ar) gas to form Fe(PO$_3$)$_2$ crystals. While Ni foam was used for this example, other metallic and metal alloy foams or carbon cloth paper may also be used as the substrate, including but not limited to cobalt (Co), copper (Cu), iron (Fe), titanium (Ti), as well as alloys and combinations thereof. The phosphorus source in this example was sodium hypophosphite monohydrate (NaH$_2$PO$_2$·H$_2$O), which was put in the upstream at around 400° C. After thermal phosphidation, the coated sample was cooled to room temperature under the protection of argon, and used directly as the working electrode. An iron nitrate solution was prepared by dissolving 0.75 g Fe(NO$_3$)$_3$·9H$_2$O precursor in 5 mL deionized (DI) water with a resistivity of 18.3 MΩ·cm.

For comparison, a three-dimensional Ni$_2$P foam was synthesized from the commercial Ni foam under the same conditions as that of preparing Fe(PO$_3$)$_2$. The Ni$_2$P foam was fabricated by direct thermal phosphatizaction without the use of the iron nitrate solution used to prepare the Fe(PO$_3$)$_2$.

An IrO$_2$ working electrode was prepared using the Ni foam coated with the IrO$_2$ catalysts. To prepare the IrO$_2$ working electrode, 40 mg IrO$_2$ and 60 μL Nafion, 540 μL ethanol and 400 μL deionized water (18.3 MΩ·cm resistivity) were ultrasonicated for 30 min to obtain a homogeneous dispersion. The loading of IrO$_2$ catalyst on the Ni foam is about 8 mg/cm$^2$.

FIG. 1 illustrates Raman spectra of Ni$_2$P catalysts before and after OER testing of 10,000 cycles collected under a Renishaw inVia Raman Spectroscope with He—Ne laser at 633 nm as an excitation source. In general, the acquisition time was 20 s and there were 3 accumulations. Before measurements, the spectrometer was calibrated using the Raman peak of silicon at 520 cm$^{-1}$. In order to avoid possible oxidation or any structural changes of the samples due to laser irradiation, the laser power was set around 0.2 mW during measurements. In FIG. 1, there are two prominent Raman peaks with the frequencies appearing at 526 and 1050 cm$^{-1}$ after OER testing. These peaks are very similar to that of nickel oxide, thus, transformation of Ni$_2$P to nickel oxide at the surface may occur in some embodiments during electrocatalytic water oxidation.

The electrochemical tests were performed in a three-electrode system in 1 M or 0.1 M KOH electrolyte purged with high-purity oxygen continuously. A Pt wire and mercury/mercurous oxide (Hg/HgO) reference were used as the counter and reference electrodes, respectively. The catalysts on Ni foam were used as the working electrode directly.

The OER catalytic activity was evaluated using linear sweep voltammetry (LSV) with a sweep rate of 2 mV/s, while the stability of the catalysts were studied by Chronoamperometry test and cyclic voltammetry (CV) with a sweep rate of 50 mV/s. The electrochemical properties were studied normally after the activation by 50 CV cycles. Electrochemical impedance spectroscopy (EIS) was measured at an overpotential of 300 mV from 0.1 Hz to 100 KHz with an amplitude of 10 mV. All of the measured potentials vs. the Hg/HgO were converted to a reversible hydrogen electrode (RHE) by the Nernst equation ($E_{RHE}=E_{Hg/HgO}+ 0.0591$ pH+0.098). The equilibrium potential ($E_0$) for OER is 1.23 V vs RHE, and thus the potential difference between $E_{RHE}$ and 1.23 V is the overpotential.

Voltammetry

Figures 6A, 6B, 6C:
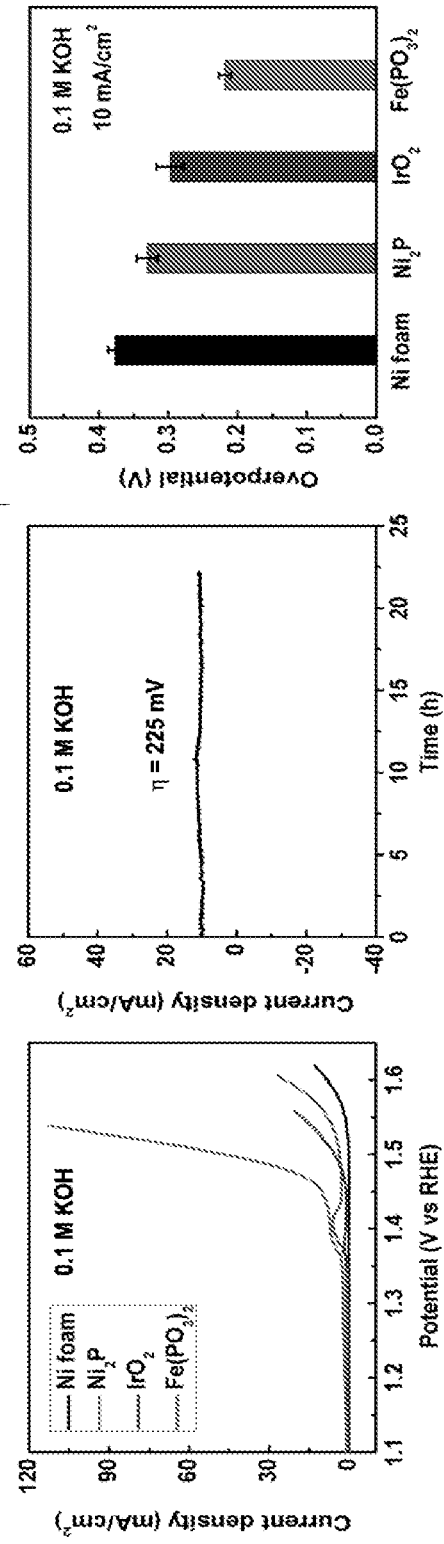
FIG. 6A presents polarization curves recorded on different electrodes with a three-electrode configuration in 0.1 M KOH electrolyte.
FIG. 6B provides chronoamperometric measurements of the OER at 10 mA/cm² on the $Fe(PO_3)_2$ electrode in 0.1 M KOH.
FIG. 6C is a bar graph representing the comparison of the overpotentials at which different electrodes of FIG. 6A reach a current density of 10 mA/cm²; the error bars represent the range of the overpotential values from three independent measurements.

Table 1, which provides a comparison of the catalytic performance (in 0.1 M KOH electrolyte) of OER electrocatalysts made from earth-abundant elements. FIG. 6B provides chronoamperometric measurements of the OER at 10 mA/cm$^2$ on the herein-disclosed Fe(PO$_3$)$_2$ electrode in 0.1 M KOH. As illustrated in FIG. 6B, the Fe(PO$_3$)$_2$ electrode is energetically survived without sign of decay at 10 mA/cm$^2$ for over 20 h in 0.1 M KOH electrolyte.

TABLE 1

Comparison of Catalytic Performance (in 0.1M KOH Electrolyte) of OER Electrocatalysts Made from Earth-Abundant Elements

| Materials | Support | η @ 10 mA/cm$^2$ | η @ 100 mA/cm$^2$ | j @ 300 mV | Source |
|---|---|---|---|---|---|
| Fe(PO$_3$)$_2$ | Ni foam | 218 mV | 301 mV | 97 mA/cm$^2$ | This work |
| Ni—Co hydroxide | ITO | 460 mV | NA | negligible | Reference |
| NiFe LDH/CNTs | Carbon paper | 308 mV | NA | 11.5 mA/cm$^{2*}$ | Reference |
| Perovskite CaCu$_3$Fe$_4$O$_{12}$ | Glassy carbon | 382 mV* | 433 mV* | <0.5 mA/cm$^2$ | Reference |
| Ultra-thin CoSe$_2$ nanosheets | Glassy carbon | 320 mV | >520 mV* | 7.5 mA/cm$^{2*}$ | Reference |
| CoSe$_2$ nanobelts/N-doped graphene | Ni foam | 366 mV | NA | <1 mA/cm$^{2*}$ | Reference |
| Co$_3$O$_4$/C nanowires | Cu foil | 290 mV | 490 mV* | 12 mA/cm$^{2*}$ | Reference |
| NiFe hydroxides | Ni foam | 240 mV | >330 mV* | 45 mA/cm$^{2*}$ | Reference |

*The value is calculated from the curves shown in the references.

Figures 2A, 2B, 2C:
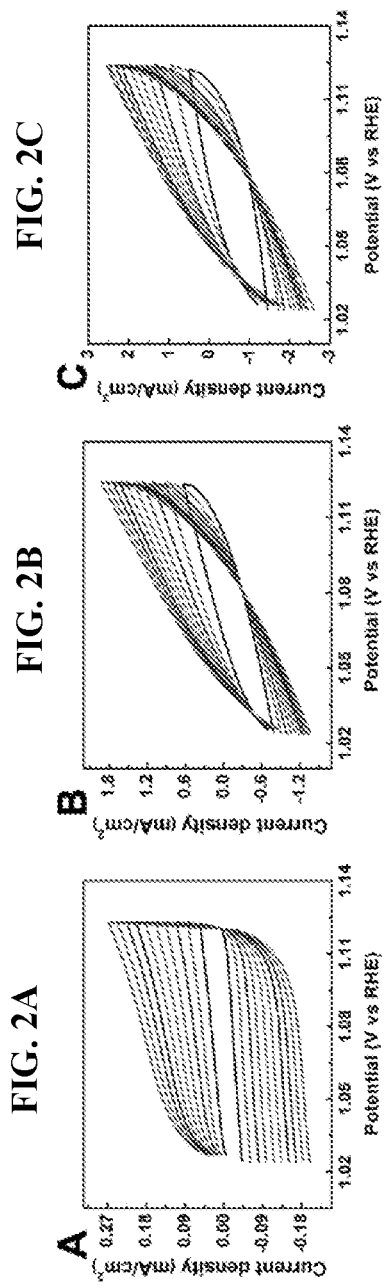
FIGS. 2A-2C illustrate typical voltammetry curves at different scan rates for uncoated Ni foam (FIG. 2A), Ni foam coated with $Ni_2P$ (FIG. 2B), Ni foam coated with $Fe(PO_3)_2$ (FIG. 2C) with scan rates ranging from 10 mV/s to 100 mV/s with an interval point of 10 mV/s.

FIGS. 2A-2C illustrate voltammetry curves at different scan rates for uncoated Ni foam (FIG. 2A), Ni foam coated with Ni$_2$P (FIG. 2B), Ni foam coated with Fe(PO$_3$)$_2$ (FIG. 2C) with scan rates ranging from 10 mV/s to 100 mV/s with an interval point of 10 mV/s. The scanning potential range is from 1.025 V to 1.125 V vs RHE.

Scanning Electron Microscopy (SEM) Images

FIGS. 3A-3C are scanning electron microscopy (SEM) images of Ni foam at varying levels of magnification prior to catalyst coating. FIGS. 4A-4C are SEM images of morphologies of as-prepared Fe(PO$_3$)$_2$ catalysts on three-dimensional Ni$_2$P/Ni foam. FIGS. 5A-5C are SEM images of the Fe(PO$_3$)$_2$ catalyst/electrode after 10,000-cycle OER testing.

Electrocatalytic Water Oxidation Activity

FIGS. 6A-6F illustrate test results from various catalysts according to certain embodiments of the present disclosure. As discussed above, in an embodiment, the catalyst loading is around 8 mg/cm$^2$. The OER activity of this Fe(PO$_3$)$_2$ catalyst and the corresponding reference materials were evaluated in a 0.1 M KOH electrolyte. FIG. 6A presents polarization curves recorded on the Ni, Ni$_2$P, IrO$_2$, and Fe(PO$_3$)$_2$ electrodes with a three-electrode configuration in 0.1 M KOH electrolyte. As shown in FIG. 6A, the Fe(PO$_3$)$_2$ electrode exhibited the highest catalytic activity towards OER requiring an overpotential as low as 218 mV to deliver a geometric current density of 10 mA/cm$^2$, whereas the Ni foam, Ni$_2$P, and the currently employed IrO$_2$ electrodes required 360, 325 and 329 mV vs RHE, respectively. FIG. 6C is a bar graph representing the comparison of the overpotentials at which different electrodes of FIG. 6A reach a current density of 10 mA/cm$^2$; the error bars represent the range of the overpotential values from three independent measurements. For the conventional catalysts, overpotentials larger than 300 mV are needed to deliver a current density of 10 mA/cm$^2$ in 0.1 M KOH electrolyte, corroborating that the herein-disclosed Fe(PO$_3$)$_2$ electrode is an outstanding OER catalyst.

Figure 6D:
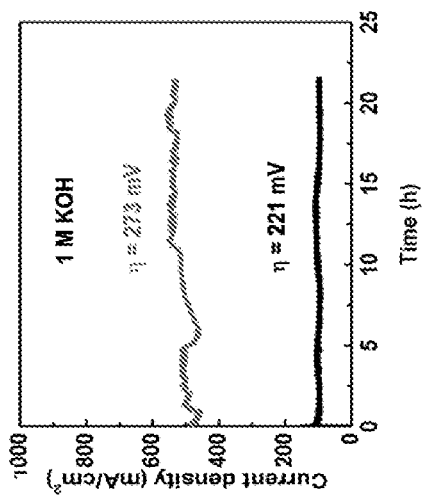
FIG. 6D presents polarization curves recorded on different electrodes with a three-electrode configuration in 1 M KOH electrolyte.
Figure 9:
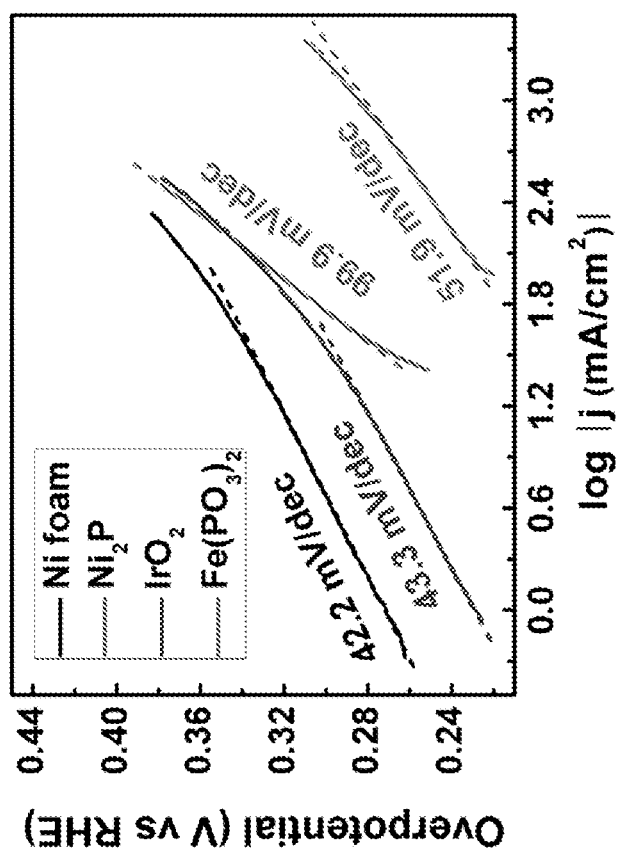
FIG. 9 illustrates a plurality of Tafel plots for Ni foam, $Ni_2P$, $IrO_2$, and $Fe(PO_3)_2$ catalysts of FIG. 6D.

Along with OER activity, stability is another criterion utilized to evaluate the OER catalysts as shown below in Table 1, which provides a comparison of the catalytic The performance of the catalysts in Table 1 at a higher concentration of electrolyte (1M KOH electrolyte) was also measured; the catalysts were expected to perform better due to higher conductivity of the electrolyte. Table 2 provides a comparison of the catalytic performance in 1 M alkaline electrolytes of these OER electrocatalysts. FIG. 6D presents polarization curves recorded on the Ni foam, Ni$_2$P, IrO$_2$, and herein-disclosed Fe(PO$_3$)$_2$ electrodes with a three-electrode configuration in 1 M KOH electrolyte. The catalytic performance among different electrodes remains the same trend as observed in 0.1 M KOH; however the measured (real) activity of each catalyst is further ameliorated as expected (FIG. 6D). Apparently, a large overpotential of 380 mV is applied to afford 500 mA/cm$^2$ for the IrO$_2$ electrode, which is dramatically decreased to only 265 mV for the Fe(PO$_3$)$_2$ electrode. Applying an overpotential of 300 mV vs RHE for activating oxygen evolution, the Fe(PO$_3$)$_2$ electrode delivers a current density of 1705 mA/cm$^2$, which is about 341-, 30-, and 49-fold better than that of Ni foam, Ni$_2$P, and the state-of-the-art IrO$_2$ catalysts in the same electrolyte, suggesting a huge improvement mainly originated from the Fe(PO$_3$)$_2$ itself, rather than the Ni$_2$P/Ni foam support. FIG. 9 illustrates a plurality of Tafel plots for the Ni foam, Ni$_2$P, IrO$_2$, and Fe(PO$_3$)$_2$ catalysts of FIG. 6D. The steady-state electrochemical analysis (FIG. 9) reveal that the Fe(PO$_3$)$_2$ electrode possesses a small Tafel slope of 51.9 mV/dec, from which it can be predicted that an overpotential about equal to 177 mV is required to reach 10 mA/cm$^2$ for this electrode.

Figure 6E:
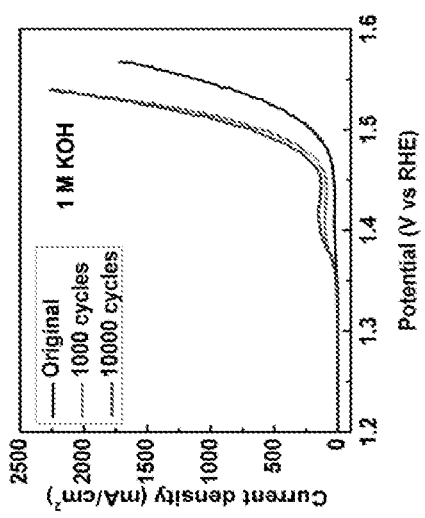
FIG. 6E presents polarization curves of the $Fe(PO_3)_2$ catalyst at its initial state and after 1,000 and 10,000 cycles of the three-electrode configuration in 1 M KOH electrolyte.
Figure 6F:
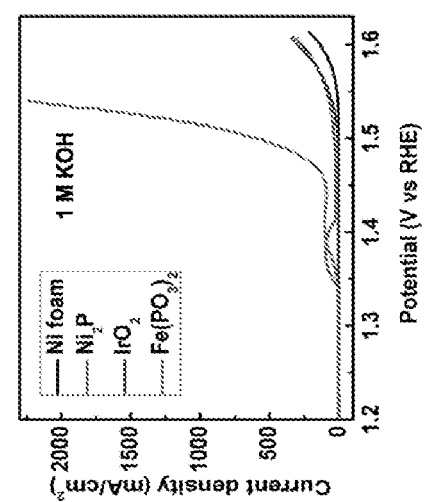
FIG. 6F provides chronoamperometric measurements of the OER at high current densities of 100 mA/cm$^2$ and 500 mA/cm$^2$ on the $Fe(PO_3)_2$ electrode in 1 M KOH.

FIG. 6E presents polarization curves of the Fe(PO$_3$)$_2$ catalyst at its initial state and after 1000 and 10,000 cycles of the three-electrode configuration in 1 M KOH electrolyte. Upon cycle voltammogram tests, the anodic current of this electrode has a slight increase even after 10,000 cycles (FIG. 6E), corroborating that the herein-disclosed electrocatalyst is extremely durable to withstand accelerated degradation. FIG. 6F provides chronoamperometric measurements of the OER at high current densities of 100 mA/cm$^2$ and 500 mA/cm$^2$ on the Fe(PO$_3$)$_2$ electrode in 1 M KOH. Notably, the Fe(PO$_3$)$_2$ electrode viably survives at a steady catalytic current density of 500 mA/cm$^2$ with a very low overpotential of 273 mV even after 20-hour chronoamperometry test (FIG. 6F). Thus, the Fe(PO$_3$)$_2$ catalyst discussed herein performs such as to be a viable option for the large-scale commercialization of water-alkali electrolyzers.

TABLE 2

Comparison of Catalytic Performance (in 1M Alkaline Electrolytes) of OER Electrocatalysts Made from Earth-Abundant Elements

| Materials | Substrate | Tafel slope (mV/dec) | η @ 10 mA/cm$^2$ | η @ 500 mA/cm$^2$ | j @ 300 mV | Electrolyte | Source |
|---|---|---|---|---|---|---|---|
| Fe(PO$_3$)$_2$ | Ni foam | 51.9 | 177 mV | 265 mV | 1705 mA/cm$^2$ | 1M KOH | This work |
| Ni$_x$Fe$_{1-x}$Se$_2$-DO | Ni foam | 28 | 195 mV | NA | NA | 1M KOH | Reference |
| NiFe LDH/r-GO | Ni foam | 39 | 195 mV | NA | NA | 1M KOH | Reference |
| Gelled FeCoW | Au foam | 37 | 190 mV | NA | NA | 1M KOH | Reference |
| NiFe LDH/CNTs | Carbon paper | 31 | 247 mV | NA | NA | 1M KOH | Reference |
| FeOOH/Co/FeOOH | Ni foam | 32 | NA | NA | 100 mA/cm$^2$* | 1M NaOH | Reference |
| CoNi(OH)$_x$ | Cu foil | 77 | 280 mV | 425 mV* | 35 mA/cm$^2$* | 1M KOH | Reference |
| h-NiS$_x$ | Ni foam | 96 | 180 mV | ~320 mV* | 440 mA/cm$^2$* | 1M KOH | Reference |
| NiFe hydroxides | Ni foam | 28 | 215 mV | NA | 400 mA/cm$^2$* | 1M KOH | Reference |
| NiSe | Ni foam | 64 | 251 mV* | NA | 40 mA/cm$^2$* | 1M KOH | Reference |
| Co$_4$N nanowire arrays | Carbon cloth | 44 | 257 mV | NA | 30 mA/cm$^2$* | 1M KOH | Reference |
| Ni$_2$P nanoparticles | Glassy carbon | 59 | 290 mV | NA | 17 mA/cm$^2$* | 1M KOH | Reference |

*The value is calculated from the curves shown in the references.

Table 3 provides XPS analysis of the atomic ratios on an exemplary Fe(PO$_3$)$_2$ electrode fabricated according to embodiments of this disclosure.

TABLE 3

XPS analysis of Atomic Ratios of Exemplary Fe(PO$_3$)$_2$ Electrode

| Element | Fe (%) | Ni (%) | P (%) | O (%) |
|---|---|---|---|---|
| Electrode | 10.6 | 0.5 | 21.3 | 67.6 |

Structural Characterization of Herein-Disclosed Fe(PO$_3$)$_2$ Catalysts

Figure 7B:
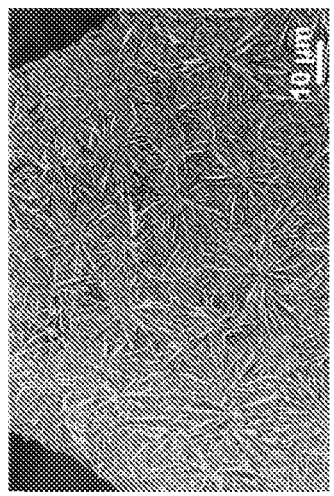
FIGS. 7A-7C are SEM images of $Ni_2P$ on Ni foam.
Figure 7A:
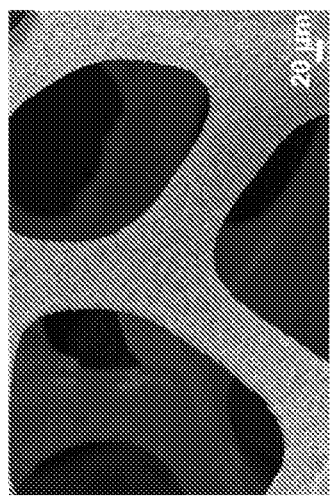
Figure 7D:
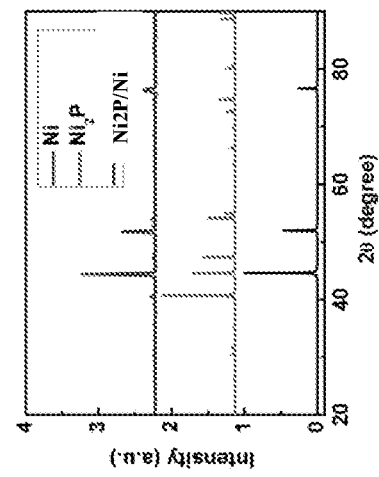
FIGS. 7D and 7E provide X-ray diffraction (XRD) patterns of Ni, $Ni_2P$, and $Ni_2P$/Ni; and Ni, $Ni_2P$, and $Fe(PO_3)_2$/$Ni_2P$/Ni catalysts, respectively.
Figure 7C:
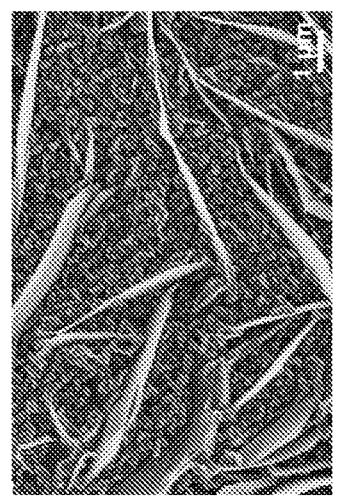
Figure 7E:
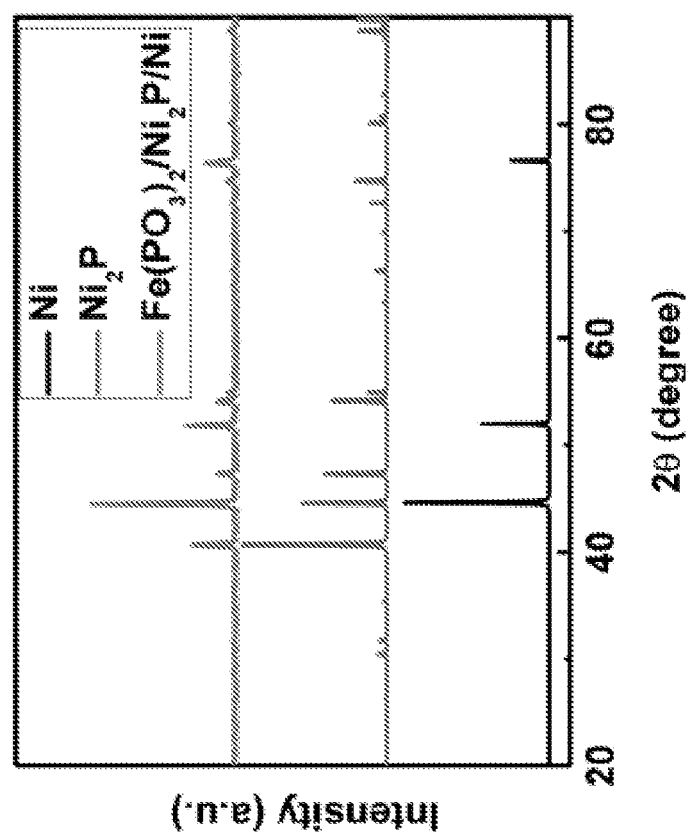

In order to determine the possible origins of the improvements, it is significant to gain further insights into the crystalline structures and surface composition of the electrocatalyst before and after electrochemical OER testing. As mentioned above, Ni foam was utilized as the conductive support because of its economics, good conductivity, and three-dimensional macroporous feature. FIGS. 7A-7C are SEM images of Ni$_2$P on Ni foam. FIG. 7D provides X-ray diffraction (XRD) patterns of Ni, Ni$_2$P, and Ni$_2$P/Ni; and FIG. 7E shows XRD patterns of Ni, Ni$_2$P, and Fe(PO$_3$)$_2$ catalysts. Characterization of the herein-disclosed Fe(PO$_3$)$_2$ catalyst via XRD indicate that the XRD peaks of the Fe(PO$_3$)$_2$/Ni$_2$P/Ni foam can be indexed to Ni foam and Ni$_2$P, indicating that Ni$_2$P was formed on the surface of the Ni foam together with Fe(PO$_3$)$_2$.

Figure 8A:
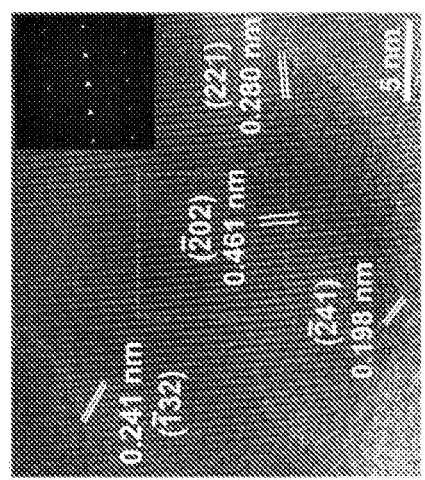
FIGS. 8A and 8B are high-resolution transmission electron microscopy (TEM) images and FFT patterns (insets) of $Fe(PO_3)_2$ catalysts as prepared and post-OER (e.g., after 10,000 cycles), respectively.
Figure 8B:
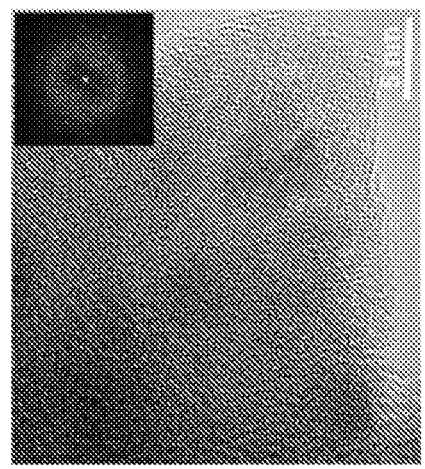

FIGS. 8A and 8B are high-resolution transmission electron microscopy (TEM) images and FFT patterns (insets) of Fe(PO$_3$)$_2$ catalysts as prepared and post-OER (e.g., after 10,000 cycles), respectively. The crystalline feature of these as-grown Fe(PO$_3$)$_2$ particles can be well resolved from the high-resolution TEM image (FIG. 8A), in which many nanocrystals show distinct lattice fringes with 0.461 nm, 0.280 nm, 0.241 nm and 0.198 nm lattice spacings marked by parallel lines, matching well with the interplanar spacings of the (202), (221), (132) and (241) crystal planes of Fe(PO$_3$)$_2$. The fast-Fourier transform (FFT) pattern taken from FIG. 8A consisting of discrete spots is another solid evidence to confirm the crystalline feature of these particles. In contrast, after OER testing (FIG. 8B), such crystal is evolved into mainly an amorphous material as confirmed by the TEM image and FFT pattern, which can be further verified by the Raman spectra.

Figure 8C:
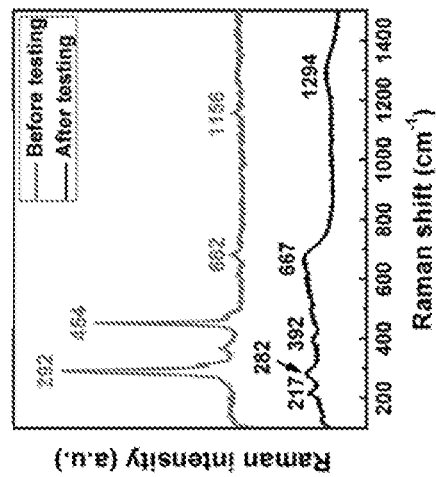
FIG. 8C provides Raman spectra of $Fe(PO_3)_2$ catalysts as prepared and post-OER (e.g., after 10,000 cycles)

FIG. 8C provides Raman spectra of Fe(PO$_3$)$_2$ catalysts as prepared and post-OER (e.g., after 10,000 cycles). The Raman spectra of FIG. 8C help to distinguish the vibration modes from different materials that two prominent peaks are located at 682 and 1156 cm$^{-1}$, which can be attributed to the symmetric PO$_2^-$ stretching vibration modes related to the inequivalent P—O$_{nb}$ bonds and the symmetric stretching vibration modes associated with the P—O—P bonds, respectively. Both of them are unique to this Fe(PO$_3$)$_2$ crystal. Other Raman peaks below 600 cm$^{-1}$ are complex and related to network bending modes. Instead, no such vibration modes of this crystal are detected after OER testing, but some other distinctive peaks are observed belonging to the unique Raman features of amorphous iron oxides, rather than those of Ni$_2$P-derived nickel oxides (FIG. 1), further indicating structure changes in this Fe(PO$_3$)$_2$ crystal during OER electrocatalysis.

Figure 8F:
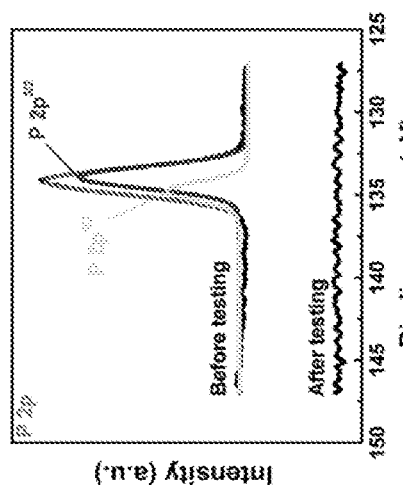
FIG. 8F provides XPS spectra of Fe 2p3/2 and 2p1/2 binding energies of $Fe(PO_3)_2$ catalysts before and after OER tests (after 10,000 cycles)
Figure 8E:
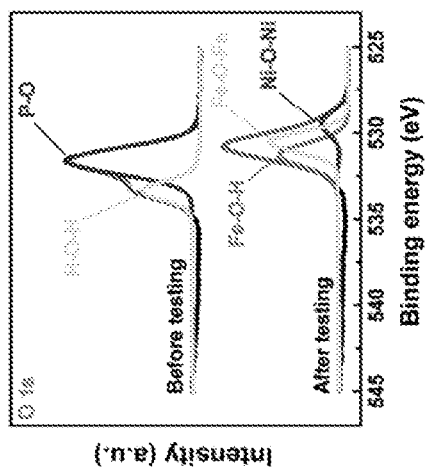
FIG. 8E provides XPS spectra of O 1 s binding energies of $Fe(PO_3)_2$ catalysts before and after OER tests (after 10,000 cycles)
Figure 8D:
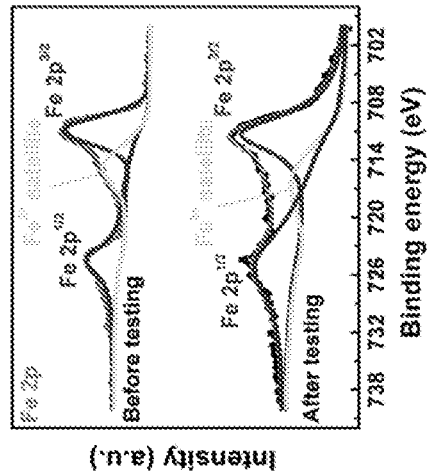
FIG. 8D provides X-ray photoelectron spectroscopy (XPS) spectra of P 2p binding energies of $Fe(PO_3)_2$ catalysts before and after OER tests (after 10,000 cycles)

In addition, elaborate XPS analysis (FIGS. 8D-8F, FIGS. 4A-4C) supports that the original material is Fe(PO$_3$)$_2$ according to the binding energies of Fe 2p$^{3/2}$, satellite peak, P 2p and O 1 s core levels, and the atomic ratio extracted from the XPS data, and that the final compound after OER testing is possibly amorphous FeOOH judged by the binding energies Fe 2p and O 1s, and the disappearance of P signals along with the atomic ratio between Fe and O elements. Specifically, FIG. 8D provides XPS spectra of P 2p binding energies of Fe(PO$_3$)$_2$ catalysts before and after OER tests (after 10,000 cycles). The P 2p peak in the original samples can be deconvoluted into two components, 2p3/2 at 133.9 eV and 2p1/2 at 134.7 eV, confirming the formation of PO3$^-$ compounds, while no P signal is detected in post-OER samples, suggesting structure changes on the catalyst surface. FIG. 8E provides XPS spectra of O 1 s binding energies of $Fe(PO_3)_2$ catalysts before and after OER tests (after 10,000 cycles). The original samples have two components of 531.8 eV for $PO3^-$ and 533.4 eV for adsorbed $H_2O$, while post-OER samples show O 1 s core-level features consisting of FeOOH and nickel oxide, indicating that amorphous FeOOH may be a dominant active site for water oxidation. FIG. 8F provides XPS spectra of Fe 2p3/2 and 2p1/2 binding energies of $Fe(PO_3)_2$ catalysts before and after OER tests (after 10,000 cycles). From FIG. 8F, it is apparent that the valence state of the Fe element is +2 for the as-synthesized samples, while it is gradually converted to +3 at the surface during water oxidation. The black and red curves in (D)-(F) are the original and fitted data, respectively.

Figures 10A, 10B, 10C:
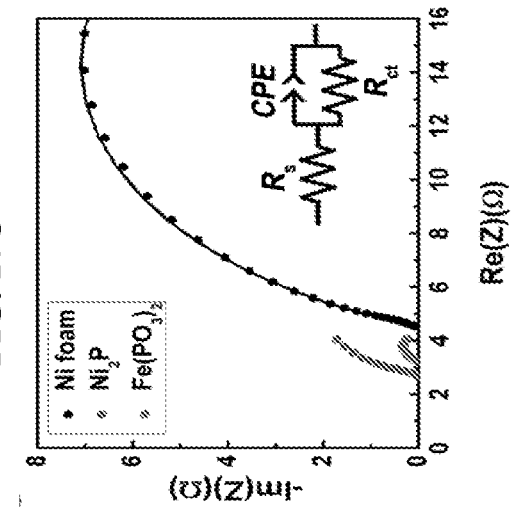
FIG. 10A is a graph of the capacitive $\Delta J$ ($=J_a-J_c$) versus the scan rates for the $Fe(PO_3)_2$ electrode compared to $Ni_2P$ and Ni foam.
FIG. 10B is a graph of a comparison of the current density of the $Fe(PO_3)_2$ electrode with those of the benchmarking $IrO_2$, $Ni_2P$ and Ni foam at 300 mV; the inset is the plot of the current density in logarithmic scale and the error bars represent the range of the current density values from three independent measurements.
FIG. 10C shows Nyquist plots of different oxygen evolution electrodes at the applied 300 mV overpotential; the inset of FIG. 10C shows the simplified Randle circuit model.

Double Layer Capacitance and Electrochemical Impedance Spectroscopy Measurements FIGS. 10A-10C are double-layer capacitance, current densities at overpotential of 300 mV, and electrochemical impedance spectroscopy (EIS) measurements for different catalysts fabricated according to certain embodiments of the present disclosure. Electrochemically active surface area is a contributor for boosting the catalytic activity of any OER catalyst. To verify this, a simple cyclic voltammetry method was introduced to determine the double-layer capacitance ($C_{dl}$), which has been deemed to be proportional to the effective surface area of the electrode.

FIG. 10A is a graph of the capacitive $\Delta J$ ($=J_a-J_c$) versus the scan rates for the $Fe(PO_3)_2$ electrode compared to $Ni_2P$ and Ni foam. FIG. 10B is a graph of a comparison of the current density of the $Fe(PO_3)_2$ electrode with those of the benchmarking $IrO_2$, $Ni_2P$ and Ni foam at 300 mV. The inset is the plot of the current density in logarithmic scale. The error bars represent the range of the current density values from three independent measurements. FIG. 10C shows Nyquist plots of different oxygen evolution electrodes at the applied 300 mV overpotential. The inset of FIG. 10C shows the simplified Randle circuit model. All measurements for FIGS. 10A-10C were performed in 1 M KOH electrolyte.

By comparing the capacitance values among different catalysts, the $Fe(PO_3)_2$ electrode has a capacitance 1.4 and 3.5-fold increase of those measured on $Ni_2P$ and its support Ni foam, respectively (FIG. 10A). There is improvement on the current density of the $Fe(PO_3)_2$ electrode with 48 and 341-fold higher than those of $Ni_2P$ and Ni foam (FIG. 10B), respectively.

This suggests that the superior performance of the inventive $Fe(PO_3)_2$ catalyst cannot be attributed solely to the change of active surface area (FIG. 10A), but to a higher intrinsic catalytic activity for water oxidation reaction than that of the $Ni_2P$ catalysts and Ni foam substrate support. To gain further insight into the high intrinsic catalytic activity, the relevant turnover frequencies (TOFs) of this $Fe(PO_3)_2$ catalyst were evaluated. The TOF can be derived from the equation $TOF=j\times A/(4\times F\times m)$, where j, A, F, and m are the current density, surface area, Faraday constant, and number of moles of the active catalysts, respectively. The inventive $Fe(PO_3)_2$ catalyst exhibits a TOF value around 0.12 $s^{-1}$ per 3d Fe atom at 300 mV in 1 M KOH, assuming that all of the Fe ions in the catalyst are electrochemically active in catalytic water oxidation. This value is substantially underestimated, since not every metal atom could be catalytically active in the OER process due to the three-dimensional architecture; it is, however, larger than many reported OER catalysts like NiFe layered double hydroxides. On the other hand, such superior catalytic performance of the inventive $Fe(PO_3)_2$ catalyst may also be related to the improved electrical conductivity, which has a significant impact on the relevant electron transfer between the catalyst and the support. To clarify this, electrochemical impedance spectroscopy (EIS) measurements were obtained to check the electrode kinetics of different catalysts (FIG. 10C). It is noteworthy that each Nyquist plot can be fitted by a semicircle with the simplified Randle circuit model (shown in the inset of FIG. 10C), from which the series resistance ($R_s$) and charge-transfer resistance ($R_{ct}$) were determined. Indeed, this $Fe(PO_3)_2$ electrode possess a much smaller $R_{ct}$ compared to other catalysts, suggesting facilitated charge transfer between the catalyst and the electrode. Without being limited by theory, the superior catalytic performance of the inventive $Fe(PO_3)_2$ catalyst may be associated with the high intrinsic catalytic activity, highly electrochemically active surface area, efficient charge transfer from the electrode, or a combination thereof.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L k^*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments Disclosed Herein Include:

A: A method of manufacturing an electrode, the method comprising: disposing a three-dimensional substrate in a metal nitrate solution; drying; and thermally phosphatizing with a phosphorus source under inert gas to form a metal based phosphate catalyst on the substrate.

B: An electrode comprising: a substrate; and a metal-based phosphate catalyst formed on a surface of the substrate.

C: A method of electrocatalytic water splitting, the method comprising: forming an oxygen-evolving electrocatalyst comprising a uniform distribution of a metal-based phosphate catalyst on a conductive substrate; and utilizing the oxygen-evolving electrocatalyst as an electrode for the oxygen evolution reaction.

Each of embodiments A, B and C may have one or more of the following additional elements: Element 1: wherein the phosphorus source is selected from sodium hypophosphite monohydrate ($NaH_2PO_2.H_2O$), ammonium hypophosphite ($NH_4H_2PO_2$), phosphorus, ammonium hypophosphite ($NH_4H_2PO_2$), phosphorus, other phosphorus containing materials, or a combination thereof. Element 2: wherein thermal phosphidation is effected at a temperature in the range of from about 350° C. to about 550° C. Element 3: wherein the metal nitrate is selected from iron nitrate, cobalt nitrate, nickel nitrate, manganese nitrate, copper nitrate, or a combination thereof. Element 4: further comprising, prior to disposing the three-dimensional substrate in the metal nitrate solution, forming the metal nitrate solution by dissolving a metal nitrate, a metal nitrate precursor, or a combination thereof in deionized (DI) water. Element 5: wherein the metal nitrate or metal nitrate precursor comprises iron(III) nitrate nonahydrate [$Fe(NO_3)_3.9H_2O$], iron (II) nitrate, cobalt nitrate, nickel nitrate, manganese nitrate, copper nitrate, or a combination thereof. Element 6: wherein the metal nitrate comprises iron(III)nitrate, and wherein the metal-based phosphate catalyst comprises ferrous metaphosphate $Fe(PO_3)_2$. Element 7: wherein the electrode comprises an $Fe(PO_3)_2/Ni_2P/Ni$ foam. Element 8: further comprising: cooling the substrate under inert gas; and repeating the steps of disposing, drying, and thermally phosphatizing. Element 9: wherein the three-dimensional substrate comprises one or more of a metallic foam or a carbon cloth paper. Element 10: wherein the metallic foam comprises nickel (Ni), copper (Cu), iron (Fe), cobalt (Co), titanium (Ti), or a combination thereof. Element 11: wherein drying comprises drying in ambient air. Element 12: wherein thermally phosphatizing comprises direct thermal phosphidation in a tube furnace or a chemical vapor deposition (CVD) system or molecular organic chemical vapor deposition (MOCVD) system under argon atmosphere. Element 13: wherein the substrate comprises a metal foam or carbon cloth paper. Element 14: wherein the metal-based phosphate catalyst comprises a metal selected from iron, manganese, cobalt, copper, nickel, or a combination thereof. Element 15: wherein the metal-based phosphate catalyst comprises ferrous metaphosphate ($Fe(PO_3)_2$), cobalt metaphosphate ($Co(PO_3)_2$), nickel metaphosphate ($Ni(PO_3)_2$), manganous metaphosphate ($Mn(PO_3)_2$), or a combination thereof. Element 16: wherein a loading of the metal-based phosphate catalyst is from about 2 to about 15 mg/cm$^2$. Element 17: wherein the substrate comprises nickel (Ni) foam, wherein the metal-based phosphate catalyst comprises ferrous metaphosphate ($Fe(PO_3)_2$), and wherein the electrode further comprises nickel phosphide ($Ni_2P$) formed between the nickel foam and the ferrous metaphosphate. Element 18: wherein the electrode comprises an $Fe(PO_3)_2/Ni_2P/Ni$ foam. Element 19: wherein the conductive substrate comprises a nickel phosphide/nickel ($Ni_2P/Ni$) foam. Element 20: wherein the metal-based phosphate catalyst comprises a metal selected from iron, manganese, cobalt, copper, nickel, or a combination thereof. Element 21: wherein the metal-based phosphate catalyst comprises ferrous metaphosphate $Fe(PO_3)_2$, and the electrode comprises a hybrid $Fe(PO_3)_2/Ni_2P/Ni$ foam. Element 22: wherein, when operated in 1M alkaline solution, the oxygen-evolving electrocatalyst yields a current density of at least 300 mA/cm$^2$ at an overpotential of less than or equal to about 265 mV, exhibits durability for at least 10,000 cycles, is operable for at least 20 hours at 300 mA/cm$^2$, or a combination thereof.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference. Unless expressly stated otherwise, the steps in a method claim may be performed in any order and with any suitable combination of materials and processing conditions.

The invention claimed is:

1. A method of manufacturing an electrode, the method comprising:
   disposing a three-dimensional substrate in a metal nitrate solution;
   drying; and
   thermally phosphatizing with a phosphorus source under inert gas to form a metal based phosphate catalyst on the substrate, wherein the metal-based phosphate catalyst comprises a metal selected from iron, manganese, copper, nickel, or a combination thereof, wherein the metal-based phosphate catalyst comprises ferrous metaphosphate ($Fe(PO_3)_2$), nickel metaphosphate ($Ni(PO_3)_2$), manganous metaphosphate ($Mn(PO_3)_2$), or a combination thereof.

2. The method of claim 1, wherein the phosphorus source is selected from sodium hypophosphite monohydrate ($NaH_2PO_2 \cdot H_2O$), ammonium hypophosphite ($NH_4H_2PO_2$), phosphorus, other phosphorus containing materials, or a combination thereof.

3. The method of claim 1, wherein thermal phosphidation is effected at a temperature in the range of from about 350° C. to about 550° C.

4. The method of claim 1, wherein the metal nitrate is selected from iron nitrate, nickel nitrate, manganese nitrate, copper nitrate, or a combination thereof.

5. The method of claim 1, further comprising, prior to disposing the three-dimensional substrate in the metal nitrate solution, forming the metal nitrate solution by dissolving a metal nitrate, a metal nitrate precursor, or a combination thereof in deionized (DI) water.

6. The method of claim 5, wherein the metal nitrate or metal nitrate precursor comprises iron(III)nitrate nonahydrate [$Fe(NO_3)_3 \cdot 9H_2O$], iron (II) nitrate, nickel nitrate, manganese nitrate, copper nitrate, or a combination thereof.

7. The method of claim 1, wherein the metal nitrate comprises iron(III)nitrate, and wherein the metal-based phosphate catalyst comprises ferrous metaphosphate $Fe(PO_3)_2$.

8. The method of claim 7, wherein the electrode comprises an $Fe(PO_3)_2/Ni_2P/Ni$ foam.

9. The method of claim 1 further comprising:
   cooling the substrate under inert gas; and
   repeating the steps of disposing, drying, and thermally phosphatizing.

10. Method of claim 1, wherein the three-dimensional substrate comprises one or more of a metallic foam or a carbon cloth paper.

11. The method of claim 10, wherein the metallic foam comprises nickel (Ni), copper (Cu), iron (Fe), cobalt (Co), titanium (Ti), or a combination thereof.

12. The method of claim 1, wherein drying comprises drying in ambient air.

13. The method of claim 1, wherein thermally phosphatizing comprises direct thermal phosphidation in a tube furnace or a chemical vapor deposition (CVD) system or molecular organic chemical vapor deposition (MOCVD) system under argon atmosphere.

14. An electrode comprising:
    a substrate; and
    a metal-based phosphate catalyst formed on a surface of the substrate,
    wherein the metal-based phosphate catalyst comprises a metal selected from iron, manganese, copper, nickel, or a combination thereof, wherein the metal-based phosphate catalyst comprises ferrous metaphosphate ($Fe(PO_3)_2$), nickel metaphosphate ($Ni(PO_3)_2$), manganous metaphosphate ($Mn(PO_3)_2$), or a combination thereof.

15. The electrode of claim 14, wherein the substrate comprises a metal foam or carbon cloth paper.

16. The electrode of claim 14, wherein the metal-based phosphate catalyst comprises a metal selected from iron, copper, nickel, or a combination thereof.

17. The electrode of claim 14, wherein a loading of the metal-based phosphate catalyst is from about 2 to about 15 $mg/cm^2$.

18. An electrode comprising:
    a substrate; and
    a metal-based phosphate catalyst formed on a surface of the substrate,
    wherein the substrate comprises nickel (Ni) foam, wherein the metal-based phosphate catalyst comprises ferrous metaphosphate ($Fe(PO_3)_2$), and wherein the electrode further comprises nickel phosphide ($Ni_2P$) formed between the nickel foam and the ferrous metaphosphate.

19. An electrode comprising:
    a substrate; and
    a metal-based phosphate catalyst formed on a surface of the substrate,
    wherein the electrode comprises an $Fe(PO_3)_2/Ni_2P/Ni$ foam.

20. A method of electrocatalytic water splitting, the method comprising:
    forming an oxygen-evolving electrocatalyst comprising a uniform distribution of a metal-based phosphate catalyst on a conductive substrate, wherein the metal-based phosphate catalyst comprises a metal selected from iron, manganese, copper, nickel, or a combination thereof, wherein the metal-based phosphate catalyst comprises ferrous metaphosphate ($Fe(PO_3)_2$), nickel metaphosphate ($Ni(PO_3)_2$), manganous metaphosphate ($Mn(PO_3)_2$), or a combination thereof; and
    utilizing the oxygen-evolving electrocatalyst as an electrode for the oxygen evolution reaction.

21. The method of claim 20, wherein the conductive substrate comprises a nickel phosphide/nickel ($Ni_2P/Ni$) foam.

22. The method of claim 21, wherein the metal-based phosphate catalyst comprises a metal selected from iron, copper, nickel, or a combination thereof.

23. The method of claim 22, wherein the metal-based phosphate catalyst comprises ferrous metaphosphate $Fe(PO_3)_2$, and the electrode comprises a hybrid $Fe(PO_3)_2/Ni_2P/Ni$ foam.

24. The method of claim 20, wherein, when operated in 1M alkaline solution, the oxygen-evolving electrocatalyst yields a current density of at least 300 $mA/cm^2$ at an overpotential of less than or equal to about 265 mV, exhibits durability for at least 10,000 cycles, is operable for at least 20 hours at 300 $mA/cm^2$, or a combination thereof.

* * * * *